United States Patent Office 3,776,986
Patented Dec. 4, 1973

3,776,986
PREPARATION OF TETRAISOPROPYL
THIOPEROXYDIPHOSPHATE
James Kalil, Wilmington, Del., assignor to E. I. du Pont
de Nemours and Company, Wilmington, Del.
No Drawing. Filed May 11, 1971, Ser. No. 142,385
Int. Cl. C07f 9/16
U.S. Cl. 260—985           12 Claims

ABSTRACT OF THE DISCLOSURE

The preparation of tetraisopropyl thioperoxydiphosphate by (a) reacting one mole phosphorous pentasulfide with at least about 5 moles of isopropyl alcohol at a temperature of from about 20° C. to the reflux temperature of the reaction mixture; (b) adding at least about 0.85 mole of $H_2O_2$ per mole of phosphorus pentasulfide utilized to the reaction mixture of Step (a) and (c) isolating the reaction product.

This process is simple and economical and yields directly from the reaction mixture a product having a greatly lessened tendency to develop disagreeable odors.

BACKGROUND OF THE INVENTION

Esters of thioperoxydiphosphoric acid are useful as accelerators in the vulcanization of sulfur-curable elastomers. Such compounds are particularly valuable for use in systems in which the elastomers is reinforced with polyester fibers in that they have less detrimental effect on the tensile properties of the fibers than do many of the conventional vulcanization accelerators such as sulfenamides and thiuram disulfides under moderately high temperature conditions.

The preparation of esters of thioperoxydiphosphoric acid starting with an alcohol and phosphorus pentasulfide ($P_2S_5$) is known. See, for example, the disclosures of U.S. Patents 2,523,146 to Rudel and Boyle and 2,523,147 to Dean and Cashman. The series of reactions may be represented as follows, where R stands for an alkyl radical:

(1) Acid formation: $P_2S_5 + 4 ROH \rightarrow$
$2(RO)_2PS-SH + H_2S$
(2) Oxidation: $2(RO)_2PS-SH + [O] \rightarrow$
$[(RO)_2PS-S]_2 + H_2O$

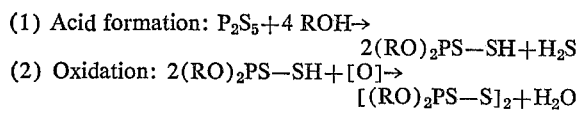

In the prior art the acid of Step (1) is generally converted to a water-soluble salt in order to separate it from water-insoluble impurities. Reacidification is then necessary to convert the salt to the acid form, which may be oxidized to the disulfide. These additional steps add to the cost of production, both in expense of materials and the expense of the extra handling and equipment. When the steps of neutralization and reacidification are omitted, the prior art processes require expensive isolation procedures in order to obtain a product having satisfactory quality for use as a rubber chemical.

Tetraisopropyl thioperoxydiphosphate is a particularly valuable material for use as a vulcanization accelerator because it is a crystalline solid which can be easily handled and incorporated into elastomers using conventional rubber processing techniques. However, when the product is prepared using conventional processes, it has a tendency to develop a disagreeable odor during storage. Even careful purification, for example, by recrystallization, it is not always completely successful in overcoming this undesirable tendency.

Thus, there is a need for a process for the preparation of tetraisopropyl thioperoxydiphosphate which is simple and economical to carry out and which yields directly from the reaction mixture a material having greatly lessened tendency to develop disagreeable odors.

THE INVENTION

In accordance with this invention there is provided a novel process for the convenient and economic production of tetraisopropyl thioperoxydiphosphate whereby the product is yielded directly from the reaction mixture and has a greatly lessened tendency to develop disagreeable odors as compared to the products prepared in accordance with prior art processes. Tetraisopropyl thioperoxydiphosphate is prepared in accordance with this invention by (a) reacting 1 mole of phosphorous pentasulfide with at least about 5 moles of isopropyl alcohol at a temperature from about 20° C. to the reflux temperature of the reaction mixture; (b) adding at least about 0.85 mole of $H_2O_2$ per mole phosphorous pentasulfide utilized to the reaction mixture of Step (a) and (c) isolating the reaction product.

In a preferred embodiment of this invention precipitated product is redissolved between Steps (b) and (c) by warming the reaction mixture to a temperature of about 70–85° C. and is then allowed to reprecipitate as the reaction mixture cools, thereby effecting a recrystallization of the reaction product before it is isolated from the reaction mixture.

In the reaction of isopropyl alcohol with phosphorus pentasulfide the stoichiometric amount of isopropanol theoretically required for the reaction is four moles per mole of $P_2S_5$. In the process of this invention, at least about 5 moles (about a 25 percent excess) are used for the following reasons:

(1) To provide a liquid reaction medium until the final product precipitates.
(2) To dissolve by-products formed so that they will not contaminate the final precipitated product.
(3) To provide a workable slurry to facilitate filtration of the final reaction mixture containing the precipitated product.
(4) To promote completion of the reaction of the alcohol with $P_2S_5$.

The upper limit of the amount of ROH is a matter of practical economics. Excessive amounts of alcohol will increase the expense of materials and handling and will decrease yield of final product because of loss due to increased solubility of the product.

In a particularly preferred embodiment of the present invention the reaction mixture of Step (a) contains, in addition to the alcohol, one to four moles of an inert diluent which is liquid at normal temperatures and pressures (that is, 25° C. and atmospheric pressure) and which is inert to the reaction medium. The diluent may be an aliphatic, alicyclic, or aromatic hydrocarbon or a chlorinated, brominated or fluorinated derivative thereof. The preferred diluents are the hydrocarbons having six to eight carbon atoms, particularly the aliphatic or alicyclic hydrocarbons, because they are inexpensive and readily available. Suitable diluents include, for example, hexane, heptane, octane, decane, cyclohexane, benzene, toluene, xylenes, tetrachloroethylene, trichloroethyl, dichlorobenzenes, and the corresponding bromo or fluoro-analogues.

The use of the inert diluent facilitates handling of the reactive phosphorus pentasulfide. For example, the phosphorus pentasulfide can be slurried in the diluent and pumped to the reaction vessel. It would be impossible to use the alcohol in the same way since it reacts rapidly with the phosphorus pentasulfide with the evolution of hydrogen sulfide. By assisting in the formation of a fluid reaction medium, the diluent makes it possible to use less of the alcohol, which is advantageous when a relatively inexpensive diluent is being used. The diluent also is more effective than the alcohol alone in making the final slurry manageable.

3

The amount of diluent to be used is about one to four moles per mole of $P_2S_5$. At least about one mole is desirable when it is used to provide a fluid medium for the $P_2S_5$. More than about four moles is not required and increases the cost of the reaction. The preferred amount is about one to two moles.

At least about five moles of isopropyl alcohol per mole of $P_2S_5$ is required to produce a satisfactory yield and to produce a product of acceptable odor. When only 5 to 6 moles of alcohol are being used, it is helpful to have the inert diluent present to assist in formation of a fluid reaction medium. This is not essential.

The preferred ratio of alcohol to $P_2S_5$ when no diluent is used is 8 to 14:1, which represents 100–250 percent stoichiometric excess. When one to four moles of diluent is used, the preferred proportion of alcohol is 5 to 8 moles per mole of $P_2S_5$.

The temperature to be used in Step (a) of the reaction ranges from about 20° C. up to the reflux temperature of the reaction mixture. Conveniently temperatures between about 20–100° C. are employed. At temperatures below about 20° C. the reaction rate is undesirably slow and expense of the process is increased because of the need for cooling. The most convenient and preferred method is to carry out the process under reflux conditions.

The time required for the reaction will depend on the temperature. Refluxing for 30 minutes to one hour should be sufficient.

Means should be provided during the process for the removal of $H_2S$ from the system. Methods for doing this are conventional.

The reaction is carried out in any acid-resistant vessel, such as glass-lined or stainless steel reactors.

In Step (a) of the reaction the phosphorus pentasulfide reacts with the alcohol to form the phosphorodithioic acid, as shown in the first step (acid formation) of the equation given hereinbefore. It has been found that the use of excess alcohol prevents the precipitation of insoluble materials and thus obviates the need for a filtration at this point. In the process of this invention the neutralization step is omitted and the oxidation can be carried out directly using the reaction mixture of Step (a).

In Step (b) of the reaction the phosphorodithioic acid is oxidized by $H_2O_2$ to the disulfide, that is, the tetra-substituted thioperoxydiphosphate.

The stoichiometric amount of $H_2O_2$ theoretically required is one-half mole per mole of the phosphorodithoic acid, or one mole per mole of phosphorous pentasulfide. In carrying out the process of this invention one uses about 85 percent to about 210 percent of the theoretical amount of $H_2O_2$ required. If less than about 85 percent is used one will not obtain the maximum yield. However, use of too large an excess of the $H_2O_2$ may result in over oxidation with the formation of undesired by-products. The preferred proportion of $H_2O_2$ agent is 95 to 125 percent of the theoretical amount.

The temperature used in oxidation step is not critical and temperatures of about 0–70° C. are conveniently employed. Much higher temperatures are likely to result in excessive by-product formation and lower yields, particularly in large-scale manufacture where temperature control is more difficult than in small-scale operations. Any lower temperature can be used at which the reaction mixture remains liquid. However, cooling increases the expense of the operation and there is no reason to use a temperature below about 0° C. The preferred range is 0–40° C. Reaction times will depend somewhat on the temperature; times of 15 minutes to two hours should be sufficient. In order to assist in temperature control it may be advantageous to carry out the reaction under reflux conditions at reduced pressures.

It is convenient and preferable to add the hydrogen peroxide as the commercially available aqueous solution

4

(about 30 percent hydrogen peroxide) although this is not essential.

During the oxidation step the tetraisopropyl thioperoxydiphosphate precipitates from solution and can be easily isolated by filtration and washing with alcohol, water, or both. At least one washing with alcohol aids in the removal of malodorous material. The product is sufficiently pure to use as a vulcanization accelerator and has the advantage that it has improved odor when compared with product prepared by conventional processes and greatly decreased tendency to develop obnoxious odors during storage.

In some instances the product may not immediately precipitate during the oxidation step and cooling may be required to effect precipitation.

For the maximum improvement in tendency to develop offensive odor on storage, it is desirable to carry out a recrystallization step before the product is filtered off. This is done by heating the reaction mass to dissolve the precipitate (temperatures of 70 to 85° C. should suffice) and allowing the product to reprecipitate during cooling. The product is then filtered off and washed in the conventional manner. This step is not necessary if the product remains in solution at the end of the oxidation step and cooling is required to effect precipitation.

The present invention is further illustrated by the following examples:

EXAMPLE 1

In this example the following materials are used:

| | Grams | Moles | Mole ratio |
|---|---|---|---|
| $P_2S_5$ | 55 | 0.25 | 1 |
| Isopropyl alcohol | 113.8 | 1.9 | 7.6 |
| $H_2O_2$ (30% aqueous solution) | 59.8 | 0.53 | 2.1 |

The apparatus used is a flask equipped with agitator, thermometer, dropping funnel, water-cooled condenser, and an off-gas outlet connected first to a trap and then to a scrubber consisting of a flask containing 30 percent NaOH solution to dissolve effluent $H_2S$ which issues from the reaction vessel.

After sweeping the flask with nitrogen the phosphorus pentasulfide is charged. Stirring is begun and the flask is heated to about 50° C. Isopropyl alcohol is added from the dropping funnel over a period of about 15 minutes, during which time the temperature rises to 70° C. The temperature is increased to the reflux temperature (about 90° C.) and the reaction mixture is refluxed for 30 minutes. The mixture is then cooled to 18° C. and the hydrogen peroxide solution is added through the dropping funnel while maintaining the temperature between 18 and 20° C. The reaction mixture is then stirred for one hour while maintaining the temperature at about 8° C. The solid product formed is removed by filtration, washed with water, and dried in a vacuum oven at 50° C. 93.6 grams of tetraisopropyl thioperoxydiphosphate having a melting point of 93–95° C. are obtained (90% of theoretical).

Analyses shows the following (percent): Calc'd: C, 33.8; H, 6.6; S, 30.5; P, 14.6. Found: C, 32.8; H, 6.4; S, 31.3; P, 14.

The freshly prepared product is practically free of odor and remains odor free for two to four weeks. In comparison, the product prepared by a conventional route develops a strong mercaptan-like odor after about a week.

EXAMPLE 2

In this example the following materials are used:

| | Grams | Moles | Mole ratio |
|---|---|---|---|
| $P_2S_5$ | 666 | 3 | 1 |
| Isopropyl alcohol | 2,388 | 39.8 | 13.3 |
| $H_2O_2$ (30% aqueous solution) | 310.2 | 2.7 | 0.9 |

Essentially the same procedure is followed as in Example 1. The alcohol is added at 60–70° C. over a period of 40 minutes. The reaction mixture is refluxed at 80–90° C. for about one hour. The reaction mixture is cooled and the hydrogen peroxide is added over a period of 2 hours while maintaining the temperature at 7–16° C. The precipitate is redissolved by refluxing at 80–85° C. for 15 minutes. The mixture is then allowed to cool. The product is filtered and washed with isopropyl alcohol and dried in a vacuum oven at 50° C. The product weighs 1053.7 g. (84.4 percent yield) and has a melting point of 92–96° C. Analysis shows the following (percent): Calc'd: C, 33.8; H, 6.6; S, 30.5; P, 14.6. Found: C, 32.8; H, 6.3; S, 28.5; P, 15.2.

The product prepared using the recrystallization step is relatively free of odor and has not developed any significant amount of odor after 8 months.

EXAMPLE 3

This experiment is carried out essentially as described in Example 2 except that the oxidation step is carried out at 30–38° C. The materials used are:

| | Grams | Moles | Mole ratio |
|---|---|---|---|
| $P_2S_5$ | 133.2 | 0.6 | 1 |
| Isopropyl alcohol | 477.6 | 8.0 | 13.3 |
| $H_2O_2$ (30%) | 65.4 | 0.58 | 0.97 |

The alcohol is added over a period of 15 minutes at 26–67° C. Refluxing at 81–88° C. is carried out for about an hour.

The hydrogen peroxide is added at 30–38° C. over a 20-minute period. The mixture is then refluxed to redissolve the precipitate and is then cooled to 5° C. The product is filtered, washed with isopropyl alcohol and dried. The product weighs 208.2 grams (83.4 percent of theory) and melts at 93.5–96.5° C.

With respect to odor and odor development the product is similar to that of Example 2.

EXAMPLE 4

This experiment is carried out using apparatus similar to that of Example 1. The following materials are used:

| | Grams | Moles | Mole ratio |
|---|---|---|---|
| $P_2S_5$ | 104.5 | 0.47 | 1 |
| n-Heptane | 68 | 0.68 | 1.4 |
| Isopropyl alcohol | 141 | 2.35 | 5 |
| Hydrogen peroxide (10 percent aqueous solution) | 158 | 0.47 | 1 |

The heptane and $P_2S_5$ are charged to the flask and heated to 70° C. The alcohol is added over a period of 40 minutes while maintaining the temperature at 70–75° C. The mixture is heated at 90–98° C. for about an hour.

The hydrogen peroxide is added gradually to the reaction mixture over a period of about 50 minutes while maintaining the temperature at 50–55° C. and the pressure at 190–220 mm. Hg. The pressure is returned to atmospheric and the reaction mixture is heated to about 71° C. to redissolve the solid product precipitated. The mixture is then cooled to reprecipitate the product. The product is filtered and washed, first with isopropyl alcohol and then with water, and dried in a vacuum oven. 170 grams of dry product are obtained (85 percent yield). The melting point is 88.8–91.1° C. The product has satisfactory odor.

EXAMPLE 5

The following materials are used:

| | Grams | Moles | Mole ratio |
|---|---|---|---|
| $P_2S_5$ | 70 | 0.32 | 1 |
| n-Heptane | 45.5 | 0.45 | 1.4 |
| Isopropyl alcohol | 113.5 | 1.89 | 5.9 |
| Hydrogen peroxide (13.4 percent aqueous solution) | 80 | 0.32 | 1 |

The mixture of $P_2S_5$ and heptane in the flask is heated to 70°–75° C. and the alcohol is added over a period of 26 minutes. The mixture is refluxed (85–90° C.) for two hours. The oxidation is carried out at 65–70° C.

The product precipitates on cooling and is filtered off, washed, and dried as in Example 4. 109 grams (81.3 percent yield) of product melting at 90.8–92° C. are obtained. The product is satisfactory with respect to odor.

EXAMPLE 6

In this example the following materials are used:

| | Grams | Moles | Mole ratio |
|---|---|---|---|
| $P_2S_5$ | 55.5 | 0.25 | 1 |
| Isopropyl alcohol | 75.0 | 1.25 | 5 |
| Hydrogen peroxide (30%) | 28.3 | 0.25 | 1 |

The phosphorus pentasulfide is charged to the flask and the alcohol is added. The mixture is then heated to reflux and refluxed (78–99° C.) for about an hour. The reaction mixture is cooled to about 0° C. and the hydrogen peroxide is added. Some difficulty in stirring is experienced because of the thickness of the slurry. The temperature is raised to 93° C. At this temperature not all the solid material has gone into solution. The mixture is cooled to 15° C. and the product is filtered, washed with isopropyl alcohol, and dried in a vacuum oven. The yield is 96.5 percent of theoretical. The product melts at 89–90° C., and is free of objectionable odor.

EXAMPLE 7

This example illustrates addition of $P_2S_5$ to the alcohol. The materials used are as follows:

| | Grams | Moles | Mole ratio |
|---|---|---|---|
| $P_2S_5$ | 111 | 0.5 | 1 |
| Isopropyl alcohol | 398 | 6.6 | 12.2 |
| $H_2O_2$ (30%) | 52.2 | 0.5 | 1 |

The alcohol is charged to the flask and the $P_2S_5$ is added as rapidly as possible. The mixture is heated to reflux and refluxed (70–87° C.) for 45 minutes. The reaction mixture is cooled to 10° C. and $H_2O_2$ is added. The mixture is then heated to 73° C. and all the precipitate dissolves. The product is filtered at 10° C., washed with isopropyl alcohol, and dried in a vacuum oven. The dried product has no odor. The yield of product is 177.3 grams (85.2%). It melts at 92–95° C.

EXAMPLE 8

In this example the following materials are used:

| | Grams | Moles | Mole ratio |
|---|---|---|---|
| $P_2S_5$ | 55.5 | 0.25 | 1 |
| Isopropyl alcohol | 90.0 | 1.5 | 6.0 |
| n-Heptane | 80.9 | 0.8 | 3.2 |
| $H_2O_2$ (30%) | 28.3 | 0.55 | 1 |

The $P_2S_5$ and heptane are added to the flask and the isopropyl alcohol is then added. The mixture is heated and refluxed for about an hour (87–97° C.) until all the solids are in solution. The mixture is cooled to 5° C. and hydrogen peroxide is added over a period of about an hour at 5–20° C. The mixture is heated to about 82° C. (Not all of the product goes into solution.) The mixture is cooled to 5° C. and filtered. 97.9 grams of product are obtained (94.1%). The product melts at 90–91° C. and is free of objectionable odor.

EXAMPLE 9

This is a comparative example in which only the stoichiometric amount of isopropyl alcohol is used. The materials used are as follows:

|  | Grams | Moles | Mole ratio |
|---|---|---|---|
| $P_2S_5$ | 55.5 | 0.25 | 1 |
| n-Heptane | 50 | 0.5 | 2 |
| Isopropyl alcohol | 60 | 1.0 | 4 |
| $H_2O_2$ (30%) | 28.3 | 0.25 | 1 |

The $P_2S_5$ and heptane are charged to the flask and the isopropyl alcohol is added. The mixture is refluxed for 4.5 hours at about 110° C. At the end of this time there are still solids present. The mixture is transferred to a clean flask and cooled to 5° C. Hydrogen peroxide is added and the mixture is heated to about 96° C. All of the product does not dissolve. The mixture is cooled to 5° C., filtered, washed with isopropyl alcohol, and dried. 67.2 grams of material are obtained (64.6%) which melts at 83–87° C. The odor of the product makes it unsatisfactory for use as a rubber chemical.

What is claimed is:

1. A process for the preparation of tetraisopropyl thioperoxydiphosphate by (a) reacting one mole of phosphorous pentasulfide with at least about 5 moles of isopropyl alcohol at a temperature of from about 20° C. to the reflux temperature of the reaction mixture; (b) adding at least about 0.85 mole of $H_2O_2$ to the reaction mixture of Step (a) and (c) isolating the reaction product.

2. The process of claim 1 wherein about 8–14 moles of isopropyl alcohol are employed per mole of phosphorous pentasulfide.

3. The process of claim 1 wherein Step (a) is conducted at a temperature of about 20–100° C.

4. The process of claim 1 wherein about 0.95 to 1.25 moles of $H_2O_2$ are employed.

5. The process of claim 1 wherein Step (b) is conducted at a temperature of 0–70° C.

6. The process of claim 1 wherein Step (b) is conducted at a temperature of 0–40° C.

7. The process of claim 1 wherein precipitation of the reaction product is effected by cooling.

8. The process of claim 1 wherein precipitated product is redissolved between Steps (b) and (c) by warming the reaction mixture to a temperature of about 70–85° C. and is then allowed to reprecipitate as the reaction mixture cools.

9. The process of claim 1 wherein the reaction mixture of Step (a) additionally contains about 1–4 moles of an organic diluent which is liquid at 25° C. and atmospheric pressure and which is inert to the reaction medium.

10. The process of claim 9 wherein the diluent is an aliphatic, alicyclic or aromatic hydrocarbon containing about 6–8 carbon atoms.

11. The process of claim 9 wherein the amount of diluent employed is about 1–2 moles.

12. The process of claim 9 wherein about 5–8 moles of isopropyl alcohol are employed.

References Cited

UNITED STATES PATENTS

| 2,523,146 | 9/1950 | Rudel | 260—926 X |
| 2,591,577 | 4/1952 | McDermott | 260—981 X |
| 3,428,662 | 2/1969 | Millendorf et al. | 260—981 X |

LEWIS GOTTS, Primary Examiner

R. L. RAYMOND, Assistant Examiner

U.S. Cl. X.R.

260—981